United States Patent
Asbeck

[11] 3,892,268
[45] July 1, 1975

[54] PROTECTIVE TIRE AND TRACTION CHAIN FOR TIRE-EQUIPPED SERVICE VEHICLES

[76] Inventor: Heinz Asbeck, Markusstrasse 42, 46 Dortmund-Syburg, Germany

[22] Filed: Jan. 24, 1972

[21] Appl. No.: 220,264

[52] U.S. Cl. .............................. 152/172; 152/243
[51] Int. Cl. ........................................... B60c 27/06
[58] Field of Search ........................... 152/172, 243

[56] References Cited
UNITED STATES PATENTS

| | | | |
|---|---|---|---|
| 3,382,906 | 5/1968 | Muller et al. | 152/243 |
| 3,429,353 | 2/1969 | Schurle et al. | 152/243 |
| 3,603,371 | 9/1971 | Muller | 152/243 |

*Primary Examiner*—James B. Marbert
*Attorney, Agent, or Firm*—Arthur T. Fattibene

[57] ABSTRACT

This invention is directed to a protective tire and traction chain for use with tire-equipped vehicles, as for example, heavy earth-moving vehicles or the like in which the working links for effecting traction are formed with opposed working surfaces or edges and which links are perpendicularly disposed with respect to the tire and are interconnected into predetermined mesh designs by annular links disposed in a plane generally parallel to the surface of the tire to define a chain mesh which renders its application to the tire reversible with readily detachable terminal links connecting the end portions of the chain mesh to form an annular net about the tire of a vehicle.

The invention further contemplates the utilization of a series of detachable grousers and counterwebs mounted on the traction chain in circumferentially spaced relationship to further enhance traction.

4 Claims, 30 Drawing Figures

PATENTED JUL 1 1975 3,892,268

SHEET 1

INVENTOR.
HEINZ ASBECK
BY
Arthur T. Fattibene
ATTORNEY

PROTECTIVE TIRE AND TRACTION CHAIN FOR TIRE-EQUIPPED SERVICE VEHICLES

RELATED APPLICATION

This application relates to a previously filed application, Ser. No. 638,355, filed May 15, 1967 entitled Protective Tire and Traction Chain for Tire-Equipped Service Vehicles, which was abandoned on or about July 21, 1969.

Various anti-skid chains for tire-equipped vehicles are known which differ from one another in the design of the chain links and the arrangement of the links in the chain. Each such chain has working links, the so-called vertical links, which are subject to wear, and connecting links, the so-called horizontal links, for joining the working links in a chain mesh.

Among the known anti-skid chains is that disclosed in a German reference of DAS 1,204,092 formed of flat, longitudinal working links and annular links, in which recesses are formed in the working links to accommodate the connecting links. The recesses have a predetermined aperture ratio relative to the thickness of the connecting links and are disposed without the center line of the working links. It is true that in such a chain, through the separate apertures in the working links for the connecting links, the undesirable rising and cross-positioning of the working links is avoided during the operation if, for example, the anti-skid chain has been laid on the tire too loosely. However, this chain still has the disadvantage that the working links are reinforced and provided with a working area on one side only, so that they may be employed or applied to the tire in one direction only. Another disadvantage of this and other known chains is that the terminal chain links for connecting the chain ends to one another, that is the so-called chain locks, have a relatively complicated design comprising of a plurality of individual component parts, the assembly of which is rendered relatively difficult, tedious and time consuming to assemble. Accordingly, such terminal links are generally locked by means of screws whose threads are either quickly damaged in operation and/or which require special protective sleeves for the threads.

An object of this invention is to provide a protective tire and traction chain comprising of the least number of individual component parts of different characteristics and which through their design per se are rendered highly wear resistant and have a high degree of self-cleaning effect, while at the same time being of fine-mesh for maximum anti-skid and/or traction effect and which chain is rendered readily usable on either side thereof, that is, rendered reversible with respect to the tire of the vehicle.

According to this invention, the foregoing object is achieved and the disadvantages of the prior known constructions are eliminated by providing preferably forged working links comprising a working member which is substantially rectangular in shape and on which the opposed longitudinal edges are formed with opposed working surfaces. The construction of the link is such that the link has a minimum thickness along the central axis thereof and which thickness progressively increases from the central axis outwardly toward the opposed working surfaces thereof.

The projections of the respective working surfaces at least in the region of the opposed end portion of the working links are substantially ellipsoidal in shape whereby the curvature of the ellipsoidal ends approximate the radius of the outer end bridge portions of the link. Annular connecting links interconnect the working links into predetermined mesh designs and readily detachable terminal links connect the end portions of the chain mesh to define an annular chain net for circumscribing a tire.

Owing to the symmetrical design of the working links along a center plane running through the longitudinal axis thereof, as will be described, and due to the ambilateral disposal of stamped working areas, the chain may be pulled on the tire on either side and receive equal wear on both sides, i.e., the chain is rendered reversible when applied to the tire. By the tapered design of the working links in their middle portion, which reduces their thickness to one half of the thickness in the region of the working areas, the weight of the chain is kept within acceptable limits. Furthermore, the proportion of the weight of the chain to the service life thereof, and hence also the ratio of the purchase price of the chain to the service life thereof is substantially more favorable than that of chains where the working areas are stamped on one side only.

Because of the ellipsoidal tapering of the working areas, and of the whole working links in the region of their two ends in accordance with this invention, the movability of the working links in the chain aggregate, and hence the flexibility of the chain, is enhanced. The swinging range of the working links, which are joined with one another by means of the connecting links, is increased, so that they will align with one another in the chain aggregate even under a relatively acute angle. Moreover, the working links of the chain may shift radially to a greater extent relative to the annular connecting links without empeding each other. This greatly increases the self-cleaning capability of the chain of this invention.

The tapered design of the working links in the region of their ends, furthermore improves the track constancy and non-skid effect of the chain-equipped wheels. The chain with the working links designed in accordance with the invention may be relatively fine-meshed. Thus, meshes may be formed in the shape of a triangle, of which the sides are constituted by a working link each, of which one side of each triangle is disposed transversely to the direction of travel of the tire.

To increase the protection of the lateral edges of the tires, the chain according to the invention is made to extend with its working links at least with one chain mesh width over the lateral surfaces of the tires. Owing to the aforementioned tapered design of the working links at the ends thereof, the border meshes of the chains will easily fit the edge shape of the tire where the latter changes through the rolling effect at the place of (the chain's) application on the tire.

Another substantial advantage of this invention is that the links at the ends of the chain, by means of which the chain ends are joined with one another and which, furthermore, if necessary, may replace defective working links, have the identical basic shape as the working links of the chain, and that they are very quickly and simply locked through the application and spreading out of a rivet. Consequently, terminal chain and/or replacement links consist of two parts only. In their middle portion the terminal links are provided on both sides with circular hollows or recesses to accommodate the head and the opposite end of the rivet, thus protecting the rivets against wear, and making the terminal links full-fledged working links in the chain.

Other objects and structural details of the invention will become more readily apparent from the following description when read in conjunction with the accompanying drawings showing several embodiments of the working links designed according to the invention, and several preferred link patterns of chain mesh.

Figure 1:
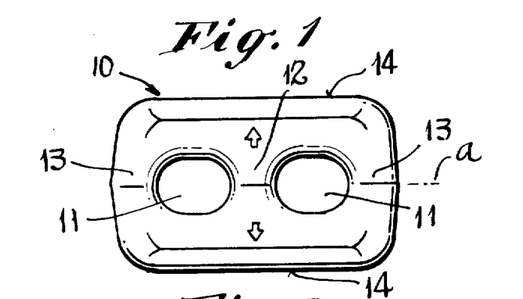
FIG. 1 is a front elevation view of the working link of this invention.
Figure 2:
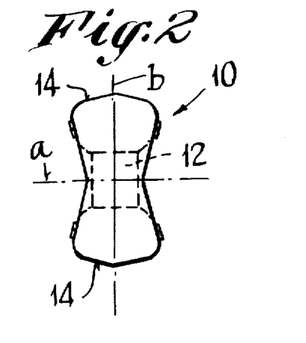
FIG. 2 is an end elevation view of FIG. 1.
Figure 3:
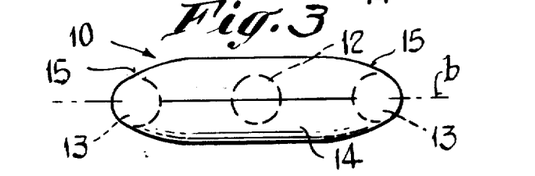
FIG. 3 is a plan or top view of the working link of FIG. 1.
Figure 11:
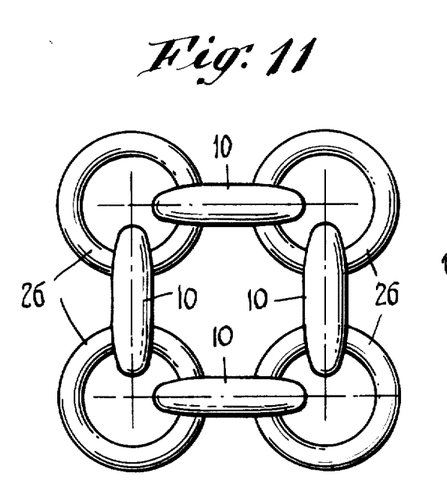
FIG. 11 is a partial plan view of still another mesh formation.
Figure 12:
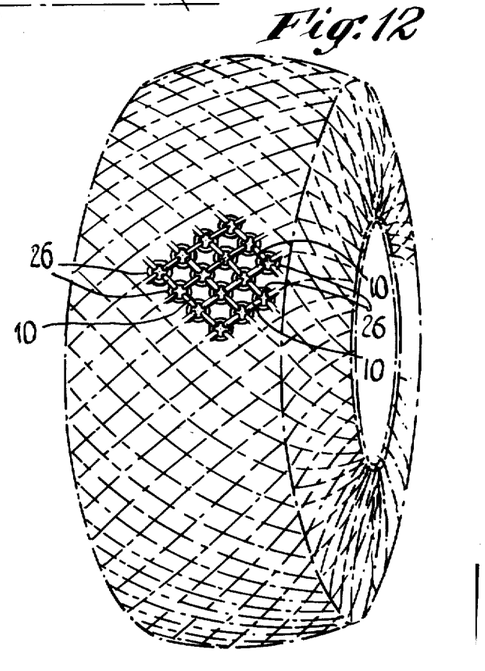
FIG. 12 illustrates the chain construction of this invention as applied to a tire.

Referring to the drawings there is shown in FIG. 12, a traction chain construction of this invention as applied to a tire of a service vehicle or the like. Accordingly, the traction chain is contructed of working links 10 which are forged in one piece, as shown in FIGS. 1 to 3. Each working link has the basic shape of a substantially quadratic body or member which is symmetrically constructed around its center axes or planes $a$ and $b$. In the illustrated form of the invention it is noted that the length and height of the body 10 is greater than the thickness thereof. In the middle portion thereof, the working link 10 is provided with two substantially oblong apertures 11 extending through the thickness of the link 10 to provide a passage for the connecting links 26, the latter being constructed as annular ring members which are welded closed, as best seen in the chain mesh formations of FIGS. 9 through 12.

The middle portion of the working link 10 is provided with a minimum thickness which extends along the central plane or axis thereof where apertures 11 are lodged. Regions 12 and 13 of the working link between the two apertures 11 and the outer end portions of the working link 10 are designed with an at least approximately round cross-section as indicated by the dash lines in FIGS. 2 and 3 so that the working links have sufficient mobility on the annular connecting links 26. The separating bridge portion 12 extends between the apertures 11 and prevents the tilting of the working link 10 in the plane thereof so that no worn or sharp edges of the link can cut into the tire, and the working links 10 are thus secured against rotation. From the middle portion of the link 10, the thickness thereof expands or progressively increases outwardly toward the opposed working surfaces 14, as shown, until the thickness adjacent the working surfaces 14 increases to a thickness approximately twice that of the thickness at the middle portion of the link, and terminates on the longitudinal sides adjacent the working or running surfaces 15, the latter of which are designed with opposed incline surfaces in a rooflike fashion to enhance the traction capability of the chain. Consequently, the construction of the working link 10, as described, enables the assembled chain to be positioned on the tire with either working surface 14 of the tractional line in contact with the tire, thereby enabling the chain to be worn ultimately on one side or the other. In other words the chain formed of working links 10 as herein described is rendered reversible in that either working surface 14 of the chain may be utilized.

In FIG. 3 it is to be noted that from the top view of the link 10 the running surfaces 15 are illustrated as tapering off in the area of the opposed end portions 13 of the working link so that a projection of the working surfaces 15 upon the drawing plane yields an approximate ellipsoidal shape 15 adjacent the edge portions of the working surfaces in the end regions 13 wherein the curvature of the ellipsoidal end portions approximate the radius of the outer end bridges 13.

Figure 4:
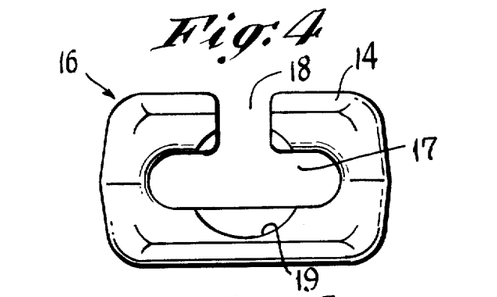
FIG. 4 is a front elevation view of a terminal link construction of this invention.
Figure 5:
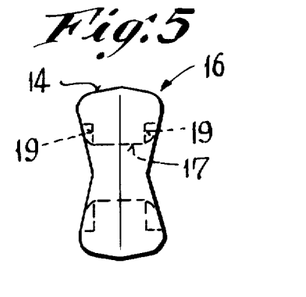
FIG. 5 is an end elevation view of the terminal link of FIG. 4.
Figure 6:
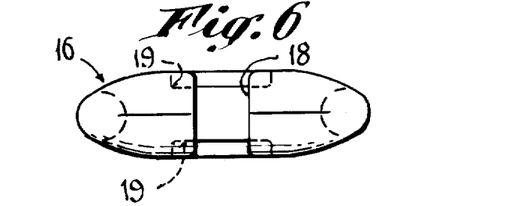
FIG. 6 is a plan or top view of the link of FIG. 4.

FIGS. 4 to 6 illustrate a terminal or replacement type link 16 for use in the traction chain of FIG. 12. The terminal or replacement link 16 is constructed with a substantially identical basic shape as that of the working link 10 illustrated in FIGS. 1 to 3.

However, the central separating bridge of the working link 10 is omitted in the terminal or replacing link 16 and in lieu thereof, a longitudinally extending aperture 17 is provided, which, by means of a transversely extending slot 18 in the central area of the working surface 14 is opened to the outside. Through slot 18 a connecting link 26 may be accommodated in aperture 17, as will be apparent. Additionally, the terminal and/or replacement links 16 are each provided on the two broadsides thereof with centrally located recesses 19, which in the illustrated embodiment are shown as being circular.

Figure 7:
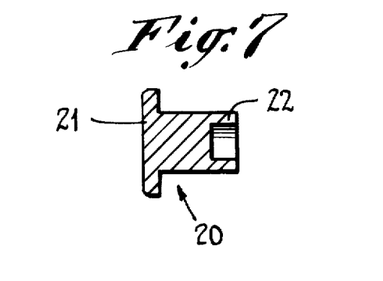
FIG. 7 is a detail sectional view of a rivet adapted for use with the terminal link of FIGS. 4 to 6.
Figure 8:
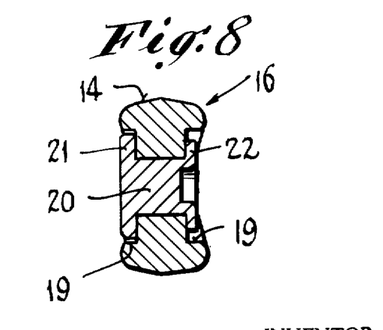
FIG. 8 is an end sectional view of the terminal link and rivet in the assembled position thereof.

In accordance with this invention a means is provided to lock the terminal or replacement link 16 of the chain quickly and advantageously and which means also functions to form a separating bridge for the center of the aperture 17. The means by which terminal link 16 may be closed comprises a rivet 20, as shown in FIG. 7. The rivet 20 comprises a flanged head portion 21 and a bead end portion 22, the head portion 21 of which is adapted to fit into the circular recess 19 provided on one side of the link. The bead portion 22 of the rivet 20 is constructed so that it may be expanded in a manner to fill up the recess 19 on the other side of the link so that both the rivet head 21 and the rivet bead 22 are embedded within their respective recesses 19 in the assembled position of the terminal and/or replacement link 16, and thus the rivet is protected from damage when the chain is placed in operation.

As indicated by its name, the terminal and/or replacement links 16 serve to connect the two ends of the mesh chain pulled over the tire along a line transversely to the direction of travel of the tire covered by the chain. Also links 16 may be used as replacement links when needed to replace individual defective and/or worn working links 10.

Figure 9:
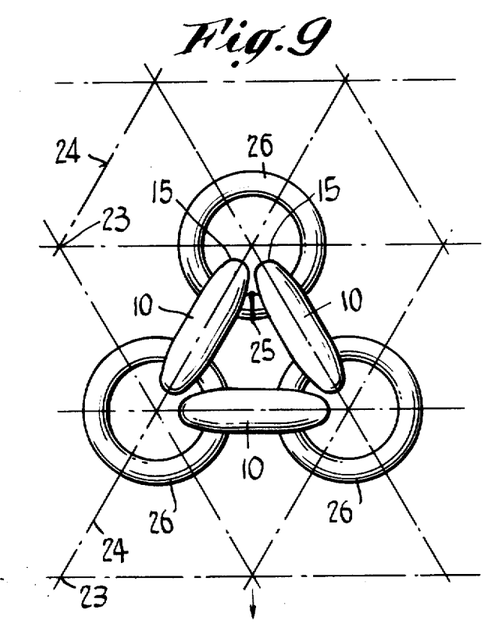
FIG. 9 is a partial plan view of a particular mesh formation.

FIG. 9 illustrates a diagrammatic illustration of a mesh design of which the links herein described may be used to form the tire traction chain. In this form of the invention the mesh design comprises of connected triangles, the apexes 23 of which are connected by the annular connecting links 26, which after they are passed through the apertures 11 of the adjacent working links 10 are closed by welding 25. The sides of the triangle meshes, so formed, are preferably defined by the length of a single working link 10 respectively. This tire traction chain is of very fine mesh and permits an arrangement covering up to almost seventy percent of the tire surface. The fine mesh design of the chain net of FIG. 9 is made possible through the ellipsoidal rounding 15 of the chain working links 10 at the ends thereof. This construction not only allows the ends of the working link 10 to be disposed relatively close to one another to form relatively acute angles, but it also provides a compact arrangement of working links 10 whereby the necessary space for effecting the welding operation on links 26 may be performed without difficulty, as for example at points 25 as shown in FIG. 9. The dead corners between the ends of the two adjacent working links 10 and the connecting rings 26 wherein dirt may settle and be retained are thus completely eliminated so that the tire traction chain, according to this invention, is provided with an excellent self-cleaning action which is most important in the case of heavy earth-moving machinery. The chain construction shown in FIG. 9 is particularly suited for especially pronounced abrasive situations, and the chain mesh is so constructed that one of the working links 10 constituting one side of every triangle of mesh design is located transversely to the direction of travel of the tire.

Figure 10:
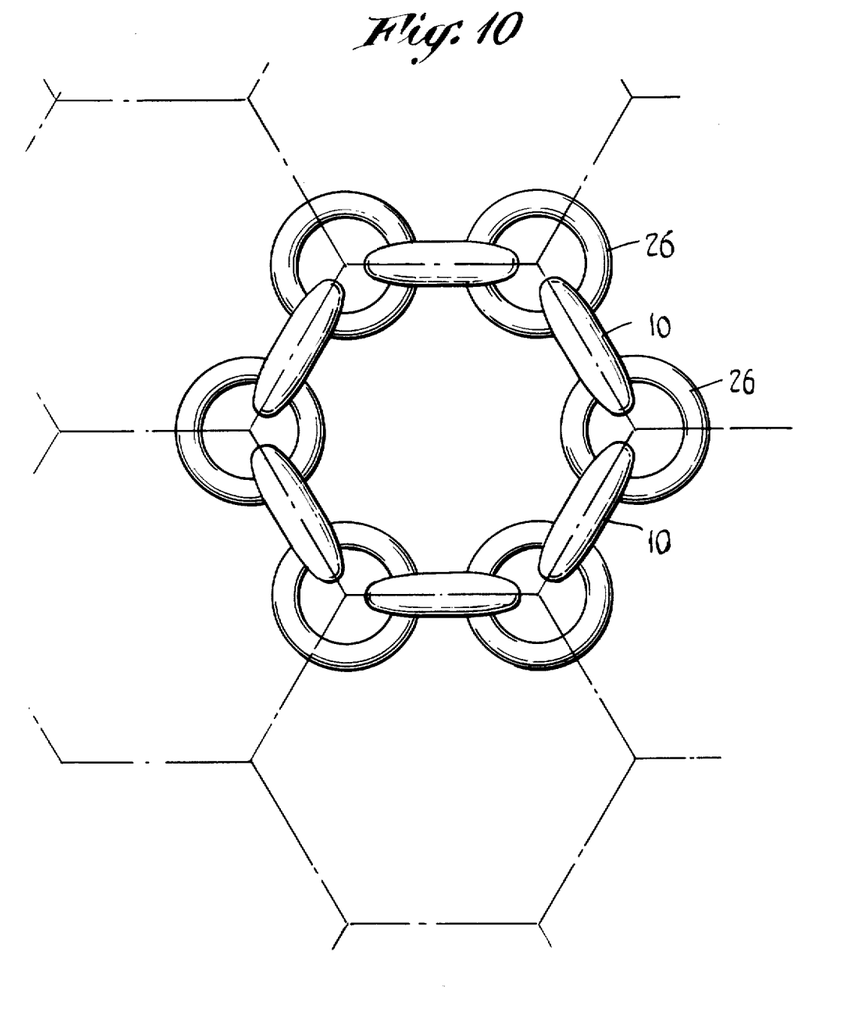
FIG. 10 is a partial plan view of a modified mesh formation.

FIG. 10 shows a modified mesh design constructed from working links 10 described in accordance with this invention and which mesh design is defined as a quadrilateral figure having four sides, the adjacent sides of which are joined by the annular connecting links 26 at the corners thereof. Each side of the quadrilateral figure is formed by the length of working link 10. In this case, the chain is preferably lodged on the tire in such a way that two sides or lengths of the working links 10 are positioned transversely to the direction of travel of the tire, and the other two working sides of the mesh configuration making up the quadratic mesh design are aligned in a direction of travel. Thus, the constructed chain mesh constitutes a combined attrition and traction chain with a favorable track-retaining capacity. As before, the tapered or ellipsoidal design of the ends of the working link 10 is again an asset when the working links which run in the direction of the travel of the tires, and the ends are the first portions of the links 10 to come into contact with the ground as such links tend to hold the track better than the male links with decidedly obtuse ends, the latter of which being further subjected to greater wear, than the tapered chain link ends 13, as described herein.

FIG. 11 is a view of a chain net in which the working links 10 are disposed in a polygonic mesh design, as for example hexagonal, which is especially appropriate for purely non-skid chains for use on vehicles working in very soft ground, and in this arrangement the mesh intersection, each consists of annular connecting links 26 with the sides of the respective polygonic mesh designs being defined by the length of one working link 10 respectively.

The chain mesh of FIG. 12 is illustrated as being diamond-shaped.

Figure 13:
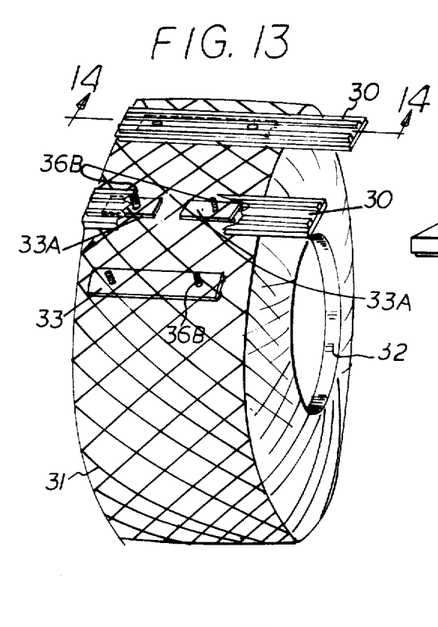
FIG. 13 is a perspective view of a modified form of the invention in which a grouser attachment is utilized in conjunction with the chain mesh construction, the latter being diagrammatically shown.

FIG. 13 illustrates a further modification of a protective tire and traction chain as utilized in combination with a grouser attachment 30. In FIG. 13 the chain or chain mesh 31 (diagrammatically shown) encases the tire 32 and is formed in a manner herein described. However, in conjunction therewith, a plurality of counterwebs or plates 33 are circumferentially spaced about the chain 31 disposed about the tire 32. Each counterweb 33 is disposed between the outer surface of the tire 32 and the chain mesh 31. It will be noted that the counterweb 33 may comprise either a single transversely extending plate 33 or may comprise of several plates, e.g. 33A—33A. Also, depending on the tire, the counterweb 33 may be slightly curved to conform to the curvature of the tire surface.

In the illustrated embodiment the counterweb 33 is formed with a pair of transversely extending ribs 33B formed on the tire side of the counterweb 33. Preferably the ribs 33B are rounded, and may be formed integral with the counterweb 33. Alternately the ribs 33B may be formed of a rubber or similar material which is suitably bonded to the tire side of the counterweb plate 33. The counterwebs 33, whether formed as a unitary member 33, or of several parts 33A—33A, extend transversely of the tire according to the width thereof.

Figure 14:
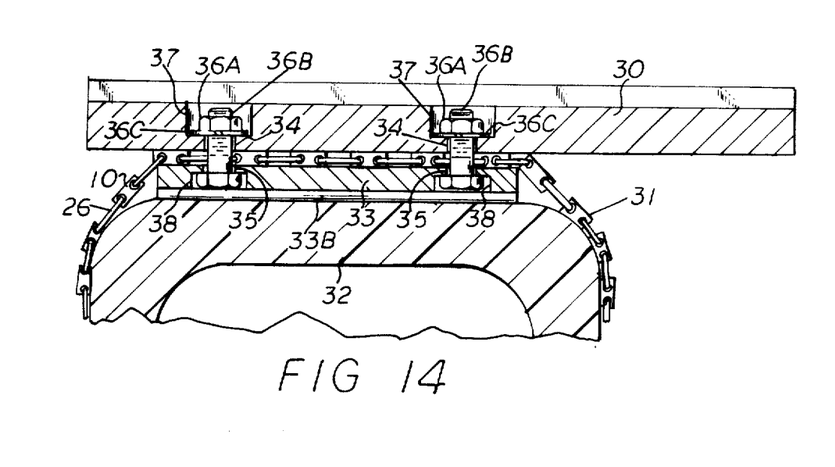
FIG. 14 is a sectional view taken along line 14—14 on FIG. 13.
Figure 15:
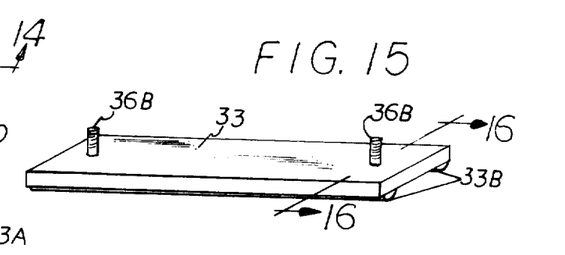
FIG. 15 is a detailed perspective view of a counterweb construction.
Figure 16:
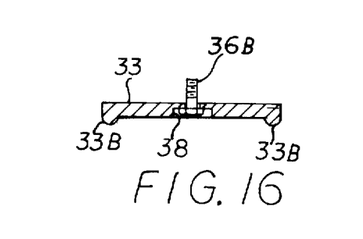
FIG. 16 is a detailed sectional view taken along line 16—16 on FIG. 15.

The complementary grouser plates 30 are disposed on the road side of the chain mesh 31 in superimposed relationship to their respective associated counterwebs 33. As best seen in FIGS. 13–14, the grousers 30 comprise a generally rectangular plate having suitable apertures 34 formed therein which are arranged to align with corresponding apertures 35 formed in the associated counterweb 33.

With the counterweb 33 and associated grouser plate 30 disposed on opposite sides of the chain mesh 31, they are secured to the chain mesh by a fastener, e.g. a nut 36A and bolt 36B with lock washer 36C, the bolt 36B being extended through aligned openings 34 and 35. It will be understood that the head end of the bolt and the associated nut 36A are recessed in suitable counterbores 37 and 38 formed in the respective grouser 30 and counterweb 33 to protect them from contact with either the tire or the road. With the construction described it will be noted that the bolts 36B in securing the grouser 30 and counterweb 33 to the chain mesh 31 extend through the holes of the connecting links 26; or through the spaces defined by adjacent links 26.

In the illustrated embodiment the length of the grouser 30 is such that it may extend laterally to one side of the tire. However, if desired the grouser 30 may be co-extensive to the width of the counterweb 33.

To enhance the traction of the respective grouser plate, the roadside surface thereof may be suitably formed with one or more ribs or other traction shaped surface.

Figure 17:
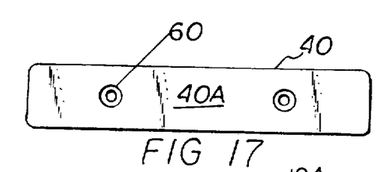
FIG. 17 is a plan view detail of a grouser plate adapted to be utilized in the arrangement of FIGS. 13 and 14.

FIGS. 17 to 29 illustrate various grouser design constructions. For example the grouser 40 of FIG. 17 is illustrated with a plane traction roadside surface 40A.

Figures 18, 18A:
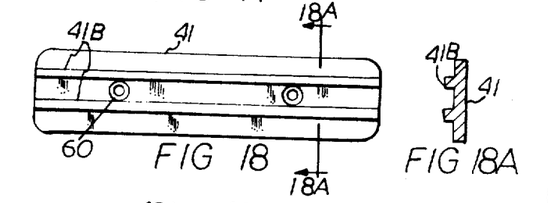
FIG. 18 is a modified grouser construction.
FIG. 18A is a detailed sectional view taken along line 18A—18A on FIG. 18.

The grouser 41 of FIG. 18 is illustrated with a pair of parallel rib projections 41B on the roadside to enhance traction.

Figure 19:
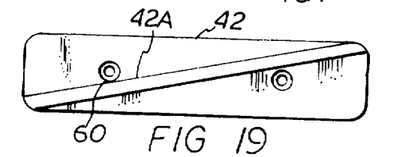
FIG. 19 is a plan view of another modified grouser construction.
Figure 20:
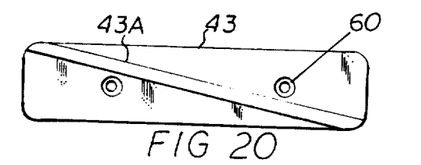
FIG. 20 is a plan view of still another modified grouser construction.

Grouser 42 of FIG. 19 and grouser 43 of FIG. 20 are shown with a diagonally extending rib 42A, 43A respectively.

Figure 21:
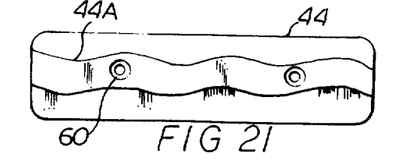
FIG. 21 is another plan view of a modified grouser construction.

The grouser 44 of FIG. 21 is provided with an undulating rib 44A on the roadside surface thereof.

Figure 22:
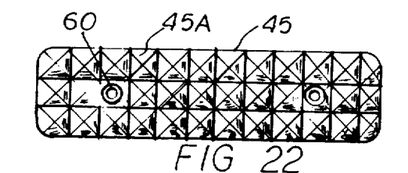
FIG. 22 is a plan view of another modified grouser construction.

FIG. 22 illustrates a grouser construction 45 in which the traction surface is provided with a series of pillow shaped projections 45A.

Figure 23:
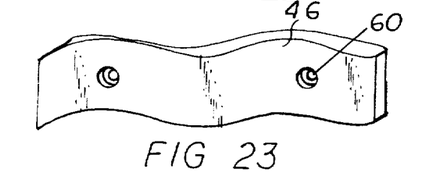
FIG. 23 is a perspective view of a modified grouser construction.

The grouser construction 46 of FIG. 23 is formed as an undulating plate as shown.

Figure 24:
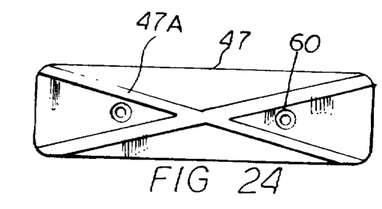
FIG. 24 is a plan view of a modified grouser construction.

The grouser plate 47 of FIG. 24 is formed with intersecting diagonal ribs 47A.

Figure 25:
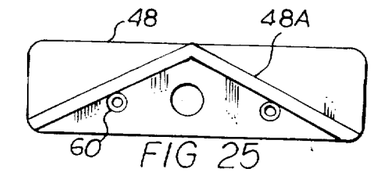
FIG. 25 is another plan view of a modified construction.

The grouser plate 48 of FIG. 25 is formed with a V-shaped rib projection on the roadside surface thereof.

Figure 26:
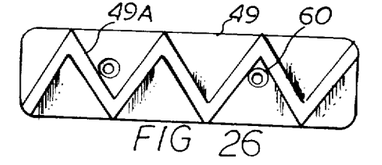
FIG. 26 is a plan view of still another modified grouser construction.

FIG. 26 illustrates a grouser plate modification 49 in which the projecting rib is formed with a zig-zag pattern 49A.

Figure 27:
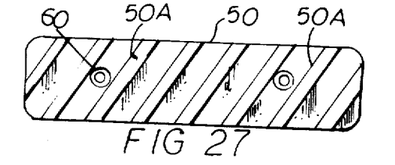
FIG. 27 is a top plan view of a modified grouser construction.

FIG. 27 illustrates a grouser plate 50 having a series of short diagonal parallel ribs 50A projecting from the roadside surface thereof.

Figure 28:
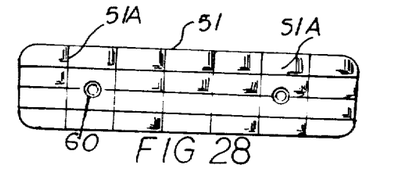
FIG. 28 is a plan view of a modified grouser construction.

FIG. 28 illustrates a grouser modification 51 having intersecting lines or grooves 51A to provide the traction.

Figure 29:
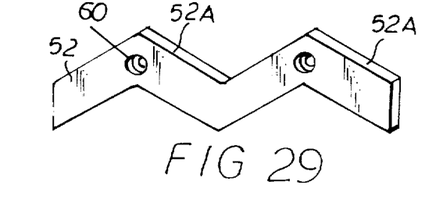
FIG. 29 is a perspective view of still another modified grouser construction.

FIG. 29 illustrates a grouser plate 52 having a plurality of V-shaped folds 52A formed therein.

Each of the grouser modifications depicted in FIGS. 17 to 29 is provided with a pair of apertures or holes 60 which are spaced to receive the bolt 36B for attachment to the chain mesh 31 as hereinbefore described with respect to FIGS. 13 and 14.

From the foregoing it will be noted that the chain mesh of the type described with respect to FIGS. 1 to 12 may be used either with or without the grouser attachments as described with respect to FIGS. 13 to 29. When the grouser attachments are utilized it is preferred that they be of like construction and with the pitch from grouser to grouser small.

While the invention has been illustrated and described with respect to particular embodiments it will be readily appreciated and understood that variations and modifications may be made without departing from the spirit or scope of the invention.

I claim:

1. A protective tire and traction chain combination adapted for use on tire-equipped vehicles comprising of:

a plurality of generally rectangularly shaped working links, having a length and width greater than the thickness thereof, each of said working links being formed with opposed working surfaces along the longitudinal edges thereof, the thickness of the respective working links progressively increasing from a horizontal center line outwardly toward the respective working surfaces thereof, the two opposed working surfaces of the working links having substantially the same width, said working links each having a pair of apertures disposed between the opposed working surfaces and extending through the thickness of said working links, each working link having a transversely extending central bridge portion to separate said pair of apertures, and opposed end bridges, each of said working links being symmetrically formed about its respective horizontal and vertical axes, each working link having its end portions substantially ellipsoidal in shape whereby the curvature of the ellipsoidal ends approximates the radius of said end bridges, connecting links for interconnecting said working links to form a chain mesh having a predetermined design, said connecting links being defined as circular rings closed by welding, and that said connecting rings have a cross-sectional area which is smaller than the area of said apertures, whereby said circular rings are loosely received in adjacent apertures of adjacent working links for interconnecting said working links to form a predetermined mesh design, said connecting links being disposed substantially parallel to the tire and normal to the longitudinal plane of said working links, readily detachable terminal links for interconnecting the ends of said chain mesh along a line transversely to the direction of travel to define an annular net, said terminal link functioning as a working link in the assembled position of said chain, each of said terminal links comprising a substantially rectangular body similar to outline to said working link, said terminal link having a longitudinally extending aperture communicating with a transversely extending slot formed in one longitudinal surface of said terminal link, each of said terminal links being formed with opposed working surfaces along the longitudinal edges thereof, the thickness of said terminal links progressively increasing from a horizontal center line outwardly toward the respective working surfaces of the terminal links, a fastener having opposed end portions adapted to extend through said terminal link aperture for closing said slot to secure the connecting links in the assembled position of said chain, said terminal link having a recess formed in the opposed side surfaces thereof for accommodating the end portions of said fastener, and said terminal link having its end portions generally ellipsoidal in shape.

2. The invention as defined in claim 1 wherein the working links are connected to define a mesh design of connected triangles.

3. The invention as defined in claim 2 wherein:

each side of said triangles is defined by one of said working links, and one side of said triangles being positioned transversely to the direction of travel of the tire covered by said chain mesh.

4. The invention as defined in claim 1 wherein the working links are joined by said connecting links to define a mesh design of connected quadrangles, wherein each side of said quadrangles is defined by the length of one working link, and wherein two sides of said quadrangles are aligned in the direction of travel of the tire covered by said chain and the other two sides of said quadrangle disposed transversely to the direction of travel.

* * * * *